United States Patent

Arken et al.

[11] 3,800,590
[45] Apr. 2, 1974

[54] DETACHMENT APPARATUS FOR BALLOON BORNE EQUIPMENT

[75] Inventors: Theodore Arken, Sunnyvale; Lawrence E. Mallery, San Jose, both of Calif.

[73] Assignee: GTE Sylvania Incorporated, Mountain View, Calif.

[22] Filed: Dec. 26, 1972

[21] Appl. No.: 318,081

[52] U.S. Cl................................................ 73/170 R
[51] Int. Cl.............................................. G01w 1/08
[58] Field of Search. 73/170 R; 116/DIG. 8, DIG. 9; 307/252 J; 329/126

[56] References Cited
UNITED STATES PATENTS
3,077,779   2/1963   Froehlich et al.................. 73/170 R
FOREIGN PATENTS OR APPLICATIONS
203,823   7/1939   Switzerland........................... 73/170

Primary Examiner—James J. Gill
Assistant Examiner—Anthony V. Ciarlante
Attorney, Agent, or Firm—John F. Lawler

[57] ABSTRACT

Balloon borne temperature sensing equipment is detached from a balloon after a predetermined flight interval by a guillotine which severs the support cords in response to a signal from an electronic timer. The timer comprises a multivibrator having an adjustable period which feeds a multistage counter, the output of which is connected to the control terminal of an electronic switch. The guillotine is connected to the output of the switch and is detonated when the switch is operated to sever the support cord as well as the electrical connection to the switch.

2 Claims, 2 Drawing Figures

//  3,800,590

DETACHMENT APPARATUS FOR BALLOON BORNE EQUIPMENT

BACKGROUND OF THE INVENTION

This invention relates to cutting mechanisms and more particularly to an improved detachment mechanism for balloon borne apparatus. The invention described herein was made in the performance of work under a NASA contract and is subject to the provisions of Section 305 of the National Aeronautics and Space Act of 1958, Public Law 85-568 (72 Stat. 435; 42 U.S.C. 2457).

The measurement of turbulence in the regions of the atmosphere up through the tropopause is an important factor in predicting the refraction of laser beams propagating through the atmosphere, in estimating the speed with which pollutants diffuse and in detecting thermal inversions. A parameter directly related to the strength of such turbulence is the temperature differential between adjacent points in space and therefore accurate progressive measurement of such temperature differential through the atmosphere and the tropopause is a prerequisite to an accurate determination of the turbulence profile in this region.

Apparatus capable of making such differential temperature measurements through the tropopause is described in the copending application of Lawrence E. Mallery et al, Ser. No. 318,090 entitled BALLOON BORNE DIFFERENTIAL TEMPERATURE SENSOR AND TRANSMISSION SYSTEM and assigned to the assignee of this invention.

In order to permit temperature sensings on both the ascent and descent flight, it is necessary that the payload be detached from the balloon after a predetermined flight interval and be allowed to return to earth through deployment of a parachute. Mechanically operated timer devices are unsatisfactory for such an application because they tend to malfunction at the extremely low temperatures which are encountered at altitudes of 15 kilometers and above. Failure of the timer device to operate means a loss of equipment as well as loss of the temperature sensings on descent.

An object of this invention is the provision of a balloon detachment mechanism for reliable operation at altitudes up to 15 kilometers or more above the earth's surface.

This and other objects of the invention are achieved with an all-electronic counter circuit having a variable frequency pulse generator and a multistage solid state binary counter responsive to the output of the pulse generator for actuating a knife operating switch after a predetermined number of pulses have been counted.

DESCRIPTION OF PREFERRED EMBODIMENT

Figure 1:
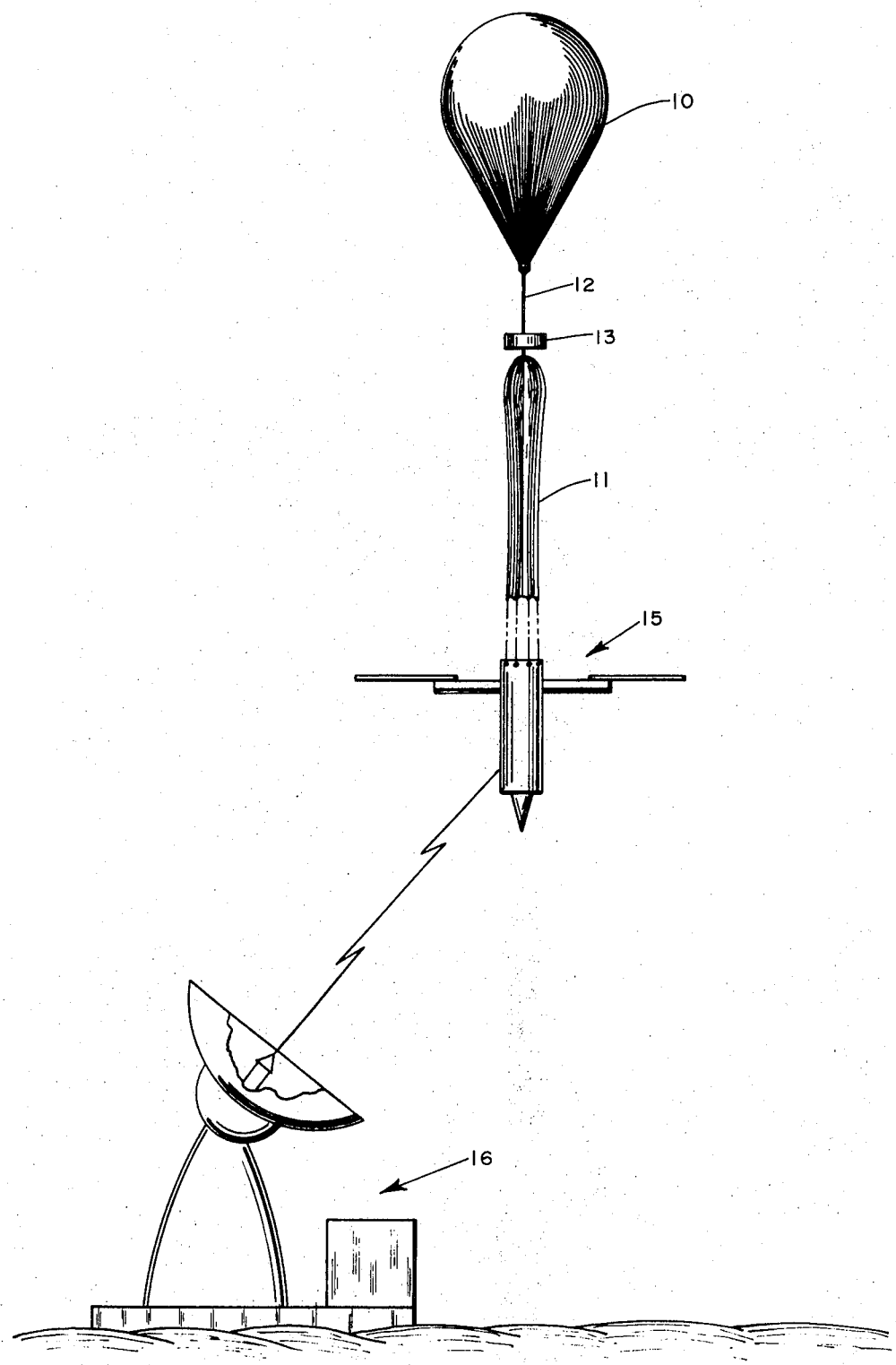
FIG. 1 is a schematic view of balloon borne sensing apparatus with a detachment mechanism embodying the invention.

Referring now to the drawings, FIG. 1 illustrates the system including a meteorological balloon 10 to which a parachute 11 is attached by cord 12 which extends through a detachment mechanism 13 embodying the invention. Supported below the parachute 11 is apparatus 15 which contains a power supply and temperature sensing and transmitting equipment for continuously sensing the temperature difference between adjacent points on the apparatus caused by turbulence during ascent and descent of the apparatus through the atmosphere. The temperature sensings are transmitted as radio frequency waves to appropriate receiving equipment 16 located on the ground and adapted to convert these readings to permanently recorded data for further computations of turbulence characteristic parameters. Electrical power for mechanism 13 may be supplied by suitable electrical conductors extending between apparatus 15 and mechanism 13 along one of the parachute shroud lines.

Figure 2:
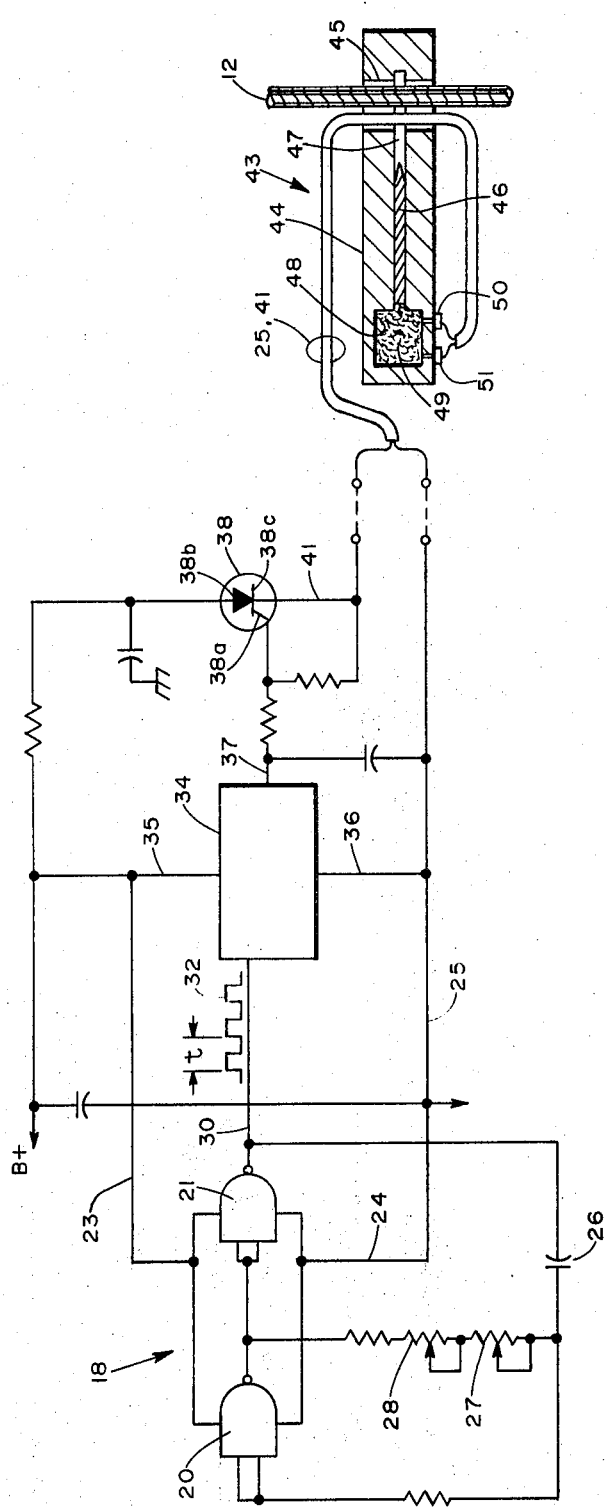
FIG. 2 is a block schematic diagram of the timing circuit and quillotine assembly embodying the invention.

Referring to FIG. 2, the timing circuit comprises a multivibrator 18 having inverters 20 and 21 connected by lines 23 and 24 to the power supply B+ and to ground line 25, respectively. The outputs and inputs of inverters 20 and 21 are interconnected as shown through a capacitor 26 and variable resistors 27 and 28 so that inverters 20 and 21 are successively and alternately conducting and non-conducting. This results in an output signal from inverter 21 on line 30 that has the form of a square wave shown at 32 when measured between lines 30 and 25. The period $t$ of the square wave pulses 32 is variable and is dependent on the adjustment of the variable resistors 27 and 28. In practice, the period $t$ is adjustable up to 0.44 seconds.

In order to count or integrate the pulses in pulse train 32, a multistage binary counter 34 has its input connected to line 30 from inverter 21 and is connected to the power supply B+ by line 35 and to ground line 25 by line 36. Counter 34 preferably is an integrated circuit capable of producing an output signal at line 37 after receiving and counting a predetermined number of pulses 32 on line 30. By way of example, a 14-stage binary counter 34 produces an output signal from the last stage on line 37 after 8,192 input pulses. For pulse periods $t$ ranging between 0.175 and 0.440 seconds depending on the settings of resistors 27 and 28, the lapsed time for counter 34 to produce an output signal on line 37 varies from 24 to 60 minutes.

Line 37 from the output of the counter is connected to the control electrode 38a of a silicon controlled rectifier 38 which functions as switch with its anode 38b connected to power supply B+ and its cathode 38c connected to line 41. When an output signal from counter 34 appears on line 37, rectifier 38 is triggered into the conducting state and rapidly connects the power supply to line 41.

Lines 41 and 25 are connected to a guillotine device 43 which is a commercially available component manufactured by Holex Incorporated, Hollister, California. Device 43 has an elongated body 44 with a transverse opening 45 through which the balloon attachment cord 12 and lines 25 and 41 extend as shown. Body 44 houses a knife blade 46 disposed in a slot 47 which traverses the opening 45 and which is connected at the opposite end to a detonation chamber 48 which contains an explosive charge 49. Terminals 50 and 51 on body 44 connect lines 24 and 41 to the charge 49. When rectifier switch 38 at the output of the counter is turned on and applies the power supply voltage to line 41, charge 49 in the guillotine body 44 is detonated propelling knife blade 46 along slot 47 and across opening to sever both the electrical lines and balloon attachment cord.

What is claimed is:

1. In combination with temperature measuring apparatus suspended from a gas-filled ballon capable of ascending from ground level through the tropopause, equipment for severing the support cord between the balloon and the apparatus comprising a guillotine device having an opening through which said support cord extends and having a blade adapted to move across said opening to sever said cord, said device having blade actuating means for propelling said blade across said opening, and means for energizing said blade actuating means a predetermined time after launching of said balloon comprising a pulse generator producing at its output a train of pulses having a predetermined period, a multistage binary counter connected to the output of said generator and producing an output signal after counting a predetermined number of pulses in the pulse train, a source of electrical power, and a switch responsive to the output signal from said counter for connecting said power source to the blade actuating means of said device.

2. The combination according to claim 1 in which said generator has means for varying the period of the pulses in said train whereby to change the counting time of said counter and correspondingly to change the time of the output signal therefrom.

* * * * *